United States Patent [19]

Lehmann

[11] E Re. 28,931

[45] Reissued Aug. 17, 1976

[54] METHOD AND APPARATUS FOR SEPARATING SELECTED CIGARETTES OR ANALOGOUS ROD-SHAPED ARTICLES FROM A SERIES OF RAPIDLY MOVING EQUIDISTANT ARTICLES

[75] Inventor: Frank-Dieter Lehmann, Wentorf, Germany

[73] Assignee: Hauni-Werke Korber & Co., KG, Hamburg, Germany

[22] Filed: Mar. 5, 1975

[21] Appl. No.: 555,621

[30] Foreign Application Priority Data

Mar. 5, 1970 Germany .....2010392

Related U.S. Patent Documents

Reissue of:

[64] Patent No.: 3,720,310
Issued: Mar. 13, 1973
Appl. No.: 120,293
Filed: Mar. 2, 1971

[52] U.S. Cl. ..... 209/74 M; 73/45.2
[51] Int. Cl.[2] ..... B07C 3/04
[58] Field of Search ..... 209/73, 74, 74 M; 73/37.6, 45.2, 45.3, 45.1

[56] References Cited

UNITED STATES PATENTS

| | | | |
|---|---|---|---|
| 3,275,136 | 9/1966 | Allen | 209/74 R |
| 3,485,357 | 12/1969 | Payne | 73/37.6 |
| 3,543,927 | 12/1970 | Pinkham | 73/45.1 |

*Primary Examiner*—Allen N. Knowles
*Attorney, Agent, or Firm*—Peter K. Kontler; John Kurucz

[57] ABSTRACT

Cigarettes or like rod-shaped articles are conveyed sideways in equidistant flutes of a rotary drum at a speed of at least one thousand articles per minute and along an ejecting station having a width which substantially exceeds and can be a multiple of the distance between a pair of neighboring flutes. Selected articles are ejected from their flutes in response to electric or pneumatic signals by being subjected to the action of a mechanical force and/or to the action of a force produced by a stream of gaseous fluid whereby the point of application of the force moves with the flute which contains the respective selected article while such flute travels through the ejecting station. The articles can be held in their flutes by suction or by mechanical means, and the suction or the mechanical retaining action is terminated when a selected article reaches the ejecting station so that the selected articles are separated under the action of gravity and/or under the action of centrifugal force. The action of gravity and/or centrifugal force can be assisted by directing against selected articles in the ejecting station one or more streams of a compressed gaseous fluid which are caused to move with the respective flutes at the same speed and in the same direction while such flutes travel along the ejecting station.

45 Claims, 12 Drawing Figures

Inventor:
FRANK-DIETER LEHMANN
BY Robert J. Stalter
ATTORNEY

Inventor:
FRANK-DIETER LEHMANN

BY Richard C. Sterling
ATTORNEY

Inventor:
FRANK-DIETER LEHMANN
BY
ATTORNEY

Inventor:
FRANK-DIETER LEHMANN

BY [illegible]
ATTORNEY

Inventor:
FRANK-DIETER LENNING
BY
ATTORNEY

Fig. 8
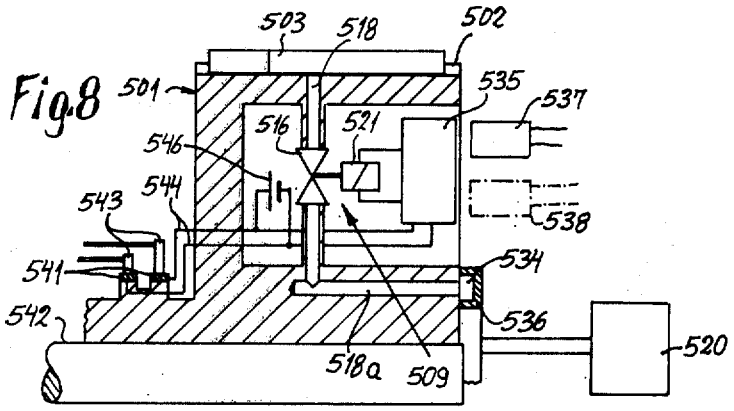
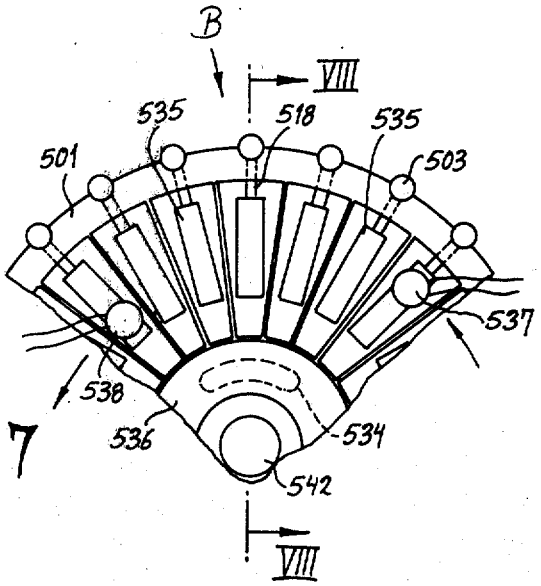
Fig. 7
Inventor:
FRANK-DIETER LEHMANN
BY
ATTORNEY

Inventor:
FRANK-DIETER LEHMANN

By [signature]
ATTORNEY

Inventor:
FRANZ-WERNER LEHMANN

By Alfred J. Hill
ATTORNEY

METHOD AND APPARATUS FOR SEPARATING SELECTED CIGARETTES OR ANALOGOUS ROD-SHAPED ARTICLES FROM A SERIES OF RAPIDLY MOVING EQUIDISTANT ARTICLES

Matter enclosed in heavy brackets [ ] appears in the original patent but forms no part of this reissue specification; matter printed in italics indicates the additions made by reissue.

BACKGROUND OF THE INVENTION

The present invention relates to a method and apparatus for segregating or separating selected rod-shaped articles from a series of rapidly moving articles, particularly for segregating tobacco-containing plain or filter-tipped rod-shaped articles or sections of filter rods while such articles or sections move sideways. For example, the method and apparatus of the present invention can be utilized to segregate defective rod-shaped tobacco-containing articles or defective sections of filter rods from a row of such articles or sections wherein the defective articles or sections are in random distribution with satisfactory articles or sections.

In the manufacture of cigarettes, cigars, cigarillos, filter rod sections and analogous rod-shaped articles which are used in the manufacture of or constitute smokers' products, the articles are tested at one or more stations to segregate from satisfactory articles those articles which exhibit one or more defects, for example, to segregate sections of a wrapped tobacco filler rod or filter rod if such sections exhibit a leak (such as a hole in the wrapper or an unsatisfactory seam between the overlapping marginal portions of the wrapper) or if the filler of a section is too dense or contains less than the desired quantity of tobacco and/or filter material. [If] *It* is also known to break up rows of closely adjacent rod-shaped articles by removing from the row each second, third, etc. article in order to convert a single row into two or more rows or to stack selected articles in trays or other types of containers. Furthermore, segregation of selected articles from a predetermined path wherein the articles move lengthwise or sideways is often necessary in order to convert a file of articles which move axially into one or more rows of articles which move sideways, or vice versa.

In the majority of presently known machines for the mass-production of cigarettes or like rod-shaped articles, the defective articles are segregated by pneumatic ejecting means. The ejecting means receives electrical or pneumatic signals which are produced by the detector or detectors of a testing unit and are employed to effect the segregation of articles at an ejecting or segregating station having a width which equals or approximates the distance between two neighboring articles. The detector or detectors scan the wrappers, the fillers and/or the heads of articles and produce signals in response to detection of one or more defects. Since a modern cigarette making machine produces up to 70 cigarettes per second, the testing of cigarettes must be carried out at the same speed and, therefore, the intervals for ejection of a defective article which is flanked by two satisfactory articles are extremely short. As a rule, the length of intervals which are allotted for ejection of defective articles in the range of one or more milliseconds. It is very difficult and highly expensive to produce satisfactory pneumatic valves which are capable of responding to electrical or pneumatic signals without any delay or with a delay which permits for segregation of a rapidly advancing article within an interval of a few milliseconds. Delayed opening of valves can result in ejection of satisfactory articles (in addition to or instead of defective articles). If the valve or valves remain open longer than for the interval which is required to move a defective article through a distance corresponding to that between the centers of two neighboring articles, a satisfactory article which follows a defective article is likely to be segregated with such defective article. Furthermore, if the defective articles are ejected by streams of compressed air, it takes a certain amount of time before the air pressure in the conduits for compressed air builds up to a value which is satisfactory for reliable expulsion of the selected article.

Certain recent types of electromagnetic valves are capable of opening and closing with a minimum of delay; however, the useful life of such valves is so short that they must be replaced at very frequent intervals and the valves are so expensive that they contribute excessively to the cost of testing apparatus for cigarettes or the like. Furthermore, since the valves are prone to malfunction after short periods of use, they are likely to cause ejection of satisfactory articles or to permit passage of defective articles during the interval which elapses between the start of malfunction and the detection of faulty operation of a valve. The operating speed of modern cigarette making or like machines being very high, even short-lasting malfunctioning of valves which are supposed to effect segregation of defective articles is likely to result in substantial losses in output or in the production, packing and sale of large quantities of defective products.

It is also known to segregate defective articles by gravity, by centrifugal force or by a combination of such forces with each other and/or with a pneumatically produced force. For example, the articles are advanced along a circular path and are held against the action of gravity and/or centrifugal force by mechanical and/or pneumatic means. The retaining force which acts upon a defective article is terminated in response to detection of a defect. Such methods and apparatus exhibit the drawbacks of the aforediscussed proposals, i.e., it is difficult to terminate the retaining action within a very short interval of time in order to insure that the ejecting force (e.g., gravity or centrifugal force) will act only upon a defective article but will be unable to dislodge a satisfactory article which precedes or follows the defective article.

It can be said that the development of reliable ejecting or segregating devices lags behind the development of machines for the mass-production and testing of plain or filter cigarettes, cigars or cigarillos and filter rod sections.

SUMMARY OF THE INVENTION

An object of the invention is to provide a novel and improved method of reliably segregating selected rod-shaped articles from a file or row of rapidly moving equidistant articles in such a way that the segregation of selected articles can be carried out without affecting the speed and/or orientation of remaining articles.

Another object of the invention is to provide a novel method of segregating selected rod-shaped articles from a row or file of equidistant articles which travel through a segregating or ejecting station at a speed of not less than 1,000 and up to and more than 4,000 articles per minute.

A further object of the invention is to provide a novel and improved method of reliably segregating defective plain or filter-tipped cigars, cigarillos, cigarettes of unit length or multiple unit length and/or filter rod sections of unit length or multiple unit length from a row or file of such articles wherein the defective articles are in random distribution with satisfactory articles and travel therewith at a speed normally exceeding the speed which is required to transport at least 1,000 articles per minute through an ejecting or segregating station.

An additional object of the invention is to provide a novel and improved apparatus for segregation of selected rod-shaped articles from a series of rapidly moving equidistant articles wherein the selected articles are randomly distributed among the remaining articles of the series or are separated from each other by predetermined numbers of remaining articles.

Still another object of the invention is to provide an apparatus for segregation of selected rod-shaped articles from a series of rapidly moving equidistant articles wherein the segregation of selected articles can be carried out by resorting to rugged, reliable and long-lasting components which cooperate to insure reliable segregation or ejection of defective or other selected articles even though they cannot respond to signals with the dispatch which is needed to segregate an article within an interval which is available to transport an article through a distance which at most equals the distance between two neighboring articles.

An additional object of the invention is to provide an apparatus which can segregate defective or other selected cigarettes or filter cigarettes from a row or file of such articles while the row or file advances at the speed at which the articles leave a modern mass-producing cigarettes making or filter cigarette making machine.

The method of the present invention is utilized for individually removing selected cigarettes or analogous rod-shaped articles from a predetermined path for a series of equidistant discrete articles moving at an elevated speed (preferably at a speed of at least 1,000 articles per minute). The removal of articles is effected by a separating force to which a selected article is subjected in response to a pneumatic or electric signal coming from a device which tests the articles for the presence of defects or from a device which produces signals at regular intervals so as to bring about a segregation of each n-th article wherein n is a whole number exceeding 1.

The method comprises the steps of starting the application of the separating force in response to a signal and in a direction which crosses the path at a point coinciding with the locus of a selected article, and moving the point of application of the separating force along the path at the speed of articles and through a predetermined distance which substantially exceeds the distance between a pair of neighboring articles of the series.

The method may comprise the additional steps of subjecting all articles of the series to the action of a mechanical or pneumatic retaining force which is stronger than the separating force and acts on the articles in a direction to retain the articles in the path, and terminating the action of the retaining force upon a selected article when such article occupies the aforementioned locus. In accordance with the just described embodiment of the method, the separating force can be a mechanical force, such as the force of gravity and/or the centrifugal force, especially if the aforementioned path is an arcuate path which is defined, for example, by a drum-shaped conveyor having axially parallel flutes or analogous receiving means for the articles of the series.

The separating force can be furnished by a gaseous fluid, e.g., by one or more streams of compressed air which are caused to move with the receiving means for the selected articles while such receiving means cover the aforementioned predetermined distance. Such distance can be between n−1 and n times the distance between a pair of neighboring articles.

The novel features which are considered as characteristic of the invention are set forth in particular in the appended claims. The improved separating apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 7 is an elevational view of a portion of a sixth apparatus which comprises a discrete ejector for each article receiving means of the conveyor;

FIG. 8 is a sectional view as seen in the direction of arrows from the line VIII—VIII of FIG. 7;

DESCRIPTION OF THE PREFERRED EMBODIMENTS

Figure 1:
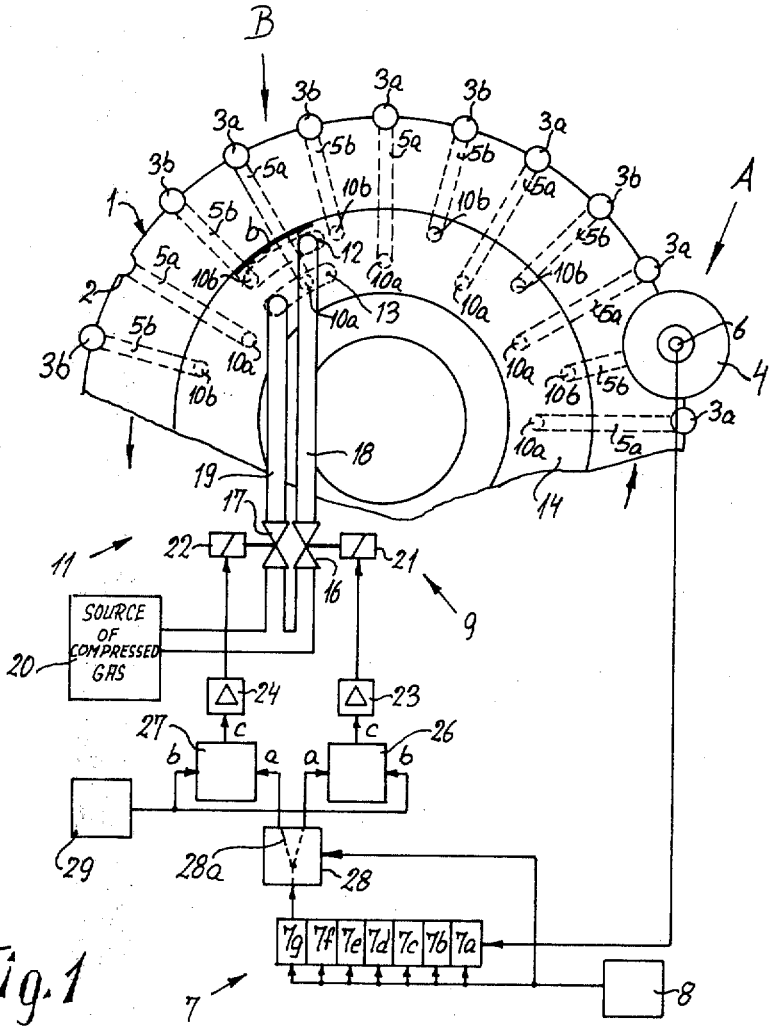
FIG. 1 is a fragmentary schematic elevational view of a separating apparatus which embodies one form of the invention and wherein the selected articles are separated by streams of a compressed gaseous fluid in response to electric signals from a testing device.

Referring first to FIG. 1, there is shown a drum-shaped conveyor 1 of the type known as HC X and produced by Hauni-Werke, Korber & Co. K.G., of Hamburg-Bergedorf, Western Germany. Reference may be had to U.S. Pat. No. 3,408,858 to Kaeding et al. The conveyor 1 (hereinafter called drum for short) is formed with axially parallel equidistant peripheral article receiving means or flutes 2 which are disposed at a predetermined distance from each other as considered in the circumferential direction of the drum. The flutes 2 are designed to receive portions of rod-like articles 3 such as plain cigars, cigarillos or cigarettes of unit length or multiple unit length, filter cigarillos, cigarettes or cigars of unit length or multiple unit length, or filter rod sections of unit length or multiple unit length. While moving sideways with the respective flutes 2, the rod-shaped articles 3 are tested for the presence or absence of defects by streams of a compressed testing fluid (normally air) which is admitted into one axial end of the filter of each article through a coupling device (not shown) which is in sealing engagement with the respective end of the wrapper on the adjacent article. Thus, the separating apparatus of FIG. 1 is *a* testing apparatus wherein defective articles are to be segregated from satisfactory articles.

Alternate flutes 2 respectively communicate with radially inwardly extending channels or ports 5a, 5b which respectively communicate with axially parallel channels or bores 10a, 10b machined into the body of the drum 1. The ports 5a are longer than the ports 5b.

A testing unit or detector 4 is mounted at a testing station A which is adjacent to the path of the flutes 2. The detector 4 is designed to detect deviations of the pressure of testing fluid from a reference pressure which is indicative of satisfactory rod-shaped articles. For example, if the detector 4 detects that the pressure of fluid issuing from the adjacent end of an article in a flute 2 which reaches the testing station A is well below the reference pressure, this normally indicates that the wrapper of the article at the testing station A has a leak which permits uncontrolled escape of testing fluid. The detector 4 then generates an electric signal and its output 6 transmits such electric signal to the first stage 7a of a shift register 7. The latter comprises seven stages 7a, 7b, 7c, 7d, 7e, 7f, 7g, and the last stage 7g is connected with the input of an electronic switching circuit 28. The stages 7a–7g of the shift register 7 are further connected with a pulse generator or timer 8 which transmits shifting pulses serving to transport electric signals which are transmitted to the stage 7a by the output 6 of the detector 4. A detector which can be used in the apparatus of FIG. 1 is disclosed, for example, in U.S. Pat. No. 3,412,856 to Esenwein.

The purpose of the testing and separating apparatus of FIG. 1 is to segregate selected (defective) articles 3 from satisfactory articles at an ejecting or segregating station B in response to signals which are transmitted to an ejector unit by way of the shift register 7. In presently known testing apparatus, the width of the ejecting station at most equals or only slightly exceeds the distance between the centers of two neighboring flutes or analogous receiving means for tested articles. The maximum width of ejecting stations in conventional testing apparatus is much closer to the distance between the centers of two neighboring flutes than to twice the distance between the centers of two neighboring flutes. As a rule, the selected (defective) articles are ejected by pneumatic means, namely, by resorting to a complex electromagnetically operated valve which is installed in a conduit for compressed gaseous fluid and opens in response to reception of a signal at the exact moment when the defective article which has caused the generation of such signal reaches the ejecting station. Such testing apparatus are sufficiently reliable for the testing of rod-like articles which are not transported at a very high speed, for example, for the testing of plain or filter cigarettes of multiple unit length. However, they are much less reliable for the testing of relatively short articles, such as plain cigarettes of unit length or filter cigarettes of unit length which are often transported at extremely high speeds of up to and in excess of 4,000 articles per minute. In can be readily calculated that the length of the interval during which an article is transported through a relatively narrow ejecting station is in the range of a few milliseconds. Valves which are sufficiently sophisticated to open at extremely rapid intervals and for extremely short periods of time are very expensive and the wear on their parts is so pronounced that the useful life of such valves is very short. Therefore, such complicated valves are not suited for the testing of plain or filter cigarettes which are transported as a series of closely or immediately adjacent articles and at a speed of several thousand articles per minute.

In accordance with one feature of the invention, the width of the ejecting station B in the testing apparatus of FIG. 1 can be increased well beyond the width of ejecting stations in conventional testing apparatus (for example, to nearly twice the distance between the centers of two neighboring flutes 2) by the provision of channels or ports 5a, 5b of different length and by the provision of an ejector unit which includes two discrete ejector valves 9 and 11, one for defective articles (3a) travelling with flutes which communicate with the ports 5a, and the other for defective articles (3b) travelling with flutes which communicate with the ports 5b. The valves 9 and 11 respectively control the admission of a compressed fluid (preferably air) into conduits 18, 19 which respectively communicate with arcuate grooves 12, 13 provided in a stationary control member here shown as a valve plate 14 which is adjacent to one end face of the rotary drum 1. The grooves 12, 13 are machined into that surface of the valve plate 14 which is in sealing engagement with the adjacent end face of the drum 1, and these grooves are located at the ejecting station B. The valve members 16, 17 of the valves 9, 11 are operated by electromagnets 21, 22 which are connected with amplifiers 23, 24. The amplifiers 23, 24 are respectively connected with bistable logical circuits 26, 27 of the type known as flip-flops. When the valve member 16 or 17 of the valve 9 or 11 is moved to an open position in response to energization of the respective electromagnet 21, 22, it respectively admits compressed gas from a source 20 to the conduit 18 or 19 whence the gas flows into the groove 12 or 13 to cause expulsion of the defective article 3a or 3b at the ejecting station B.

The amplifiers 23, 24 respectively receive signals from the outputs c of the flip-flops 26, 27. The inputs b of these flip-flops receive signals from a signal generator or timer 29 and the inputs a of the flip-flops receive signals from the electronic switching circuit 28. The signals from the timer 29 to the inputs b of the flip-flops erase the signals which are being transmitted to the amplifiers 23 and 24. The frequency at which the timer 29 transmits signals to the inputs b of the flip-flops 26, 27 is half the frequency of pulse transmission by the timer 8 for the shift register 7. The frequency of pulse transmission by the timer 8 is synchronized with the speed of the drum 1.

The switching circuit 28 has an element 28a which acts not unlike the moving contact of a two-way electric switch and can transmit signals to the input a of the flip-flop 26 (in one of its positions) and to the input a of the flip-flop 27 (in its other position). The circuit 28 can be said to constitute a component part of a signal transmitting means between the detector 4 and the ejector valve 9 or 11 to transmit to the electromagnet 21 or 22 signals which are indicative of defective articles 3a or 3b. The position of the element 28a changes at the frequency of pulse transmission by the generator 8. The entire signal transmitting means between the output 6 of the detector 4 and the electromagnets of the ejector valves 9, 11 includes the shift register 7, the pulse generator 8, the switching circuit 28, the flip-flops 26, 27, the timer 29 and the amplifiers 23, 24.

The operation:

When a defective article (e.g., one of the articles 3b which alternate with identical articles numbered 3a) reaches the detector 4, the latter produces an electric signal and its output 6 transmits such signal to the first stage 7a of the shift register 7. The signal is transported through successive stages 7b–7g by pulses transmitted by the generator 8. The transport of the signal through the shift register 7 takes place in synchronism with the transport of defective article 3b toward the ejecting station B. Thus, the defective article 3b reaches the station B when the signal reaches the last stage 7g. The element 28a of the switching circuit 28 is then located in the right-hand end position of FIG. 1 (indicated by broken lines) so that the signal is transmitted to the inpt a of the flip-flop 26 while the latter's input b does not receive a signal from the timer 29. The output c of the flip-flop 26 then transmits a signal which is amplified at 23 and energizes the electromagnet 21 of the ejector valve 9 which moves its valve member 16 to the open position so that the conduit 18 conveys a stream of compressed gaseous fluid from the source 20 into the groove 12 of the control means or valve plate 14. The electromagnet 21 is energized and moves the valve member 16 to open position with such a delay following the generation of signal by the detector 4 that the defective article 3b reaches the ejecting station B when the stream of compressed fluid issuing from the source 20 and passing through the conduit 18, groove 12, the corresponding channel or bore 10b and the corresponding channel or port 5b impinges against the defective article in its flute 2 and expels the defective article into a chute, into a collecting receptacle or into another suitable intercepting device, not shown. It is to be noted that, though FIG. 1 does not show any retaining means which produces a retaining force serving to prevent ejection of articles 3a, 3b during transport with the flutes 2 past the testing station A and toward, past and beyond the ejecting station B, it is clear that the testing apparatus is provided with suitable mechanical and/or pneumatic (suction operated) retaining means which holds the articles against movement under the action of gravity and/or centrifugal force. Since the flip-flops 26, 27 are bistable logical circuits, the signal at the output c of the flip-flop 26 remains after the transmission of signal from the switching circuit 28 is terminated. The signal at the output c of the flip-flop 26 is erased in response to transmission of a signal to its input b from the timer 29 which operates at half the frequency of the generator 8. Thus, the valve member 16 of the valve 9 remains in open position after the element 28a of the switching circuit 28 moves to its left-hand end position and for an interval which is long enough to insure the flow of a stream of compressed gaseous fluid into the groove 12 of the valve plate 14 while the flute 2 for the defective article 3b travels through the ejecting station B. The valve member 16 thereupon returns to its closed position to seal the groove 12 from the source 20. As shown in FIG. 1, the width b of the ejecting station B almost equals twice the distance between the centers of two neighboring flutes 2.

If the defective article 3b is immediately followed by a defective article 3a, the output 6 of the detector 4 again transmits an electric signal to the first stage 7a of the shift register 7, and such signal is transported to the last stage 7g by pulses furnished by the generator 8. The stage 7g emits a signal when the element 28a of the switching circuit 28 is in the solid-line left-hand end position of FIG. 1 so that the signal reaches the input a of the flip-flop 27 which energizes the electromagnet 22 of the ejector valve 11 by way of the amplifier 24 so that the valve member 17 moves to its open position and admits a stream of compressed gaseous fluid from the source 20, through the conduit 19, groove 13 of the valve member 14, the corresponding channel or bore 10a, the corresponding channel or port 5a, and into the flute 2 which contains the defective article 3a. The groove 13 remains in communication with the source 20 while the flute 2 for the defective article 3a travels through the ejecting station B so that the defective article 3a can be ejected during a portion of or during the entire interval which elapses while the corresponding flute 2 covers the distance b. Thus, the interval which is available for ejection of a defective article 3a or 3b almost equals the combined length of two intervals which are required to move an article through a distance corresponding to twice the distance between the centers of two neighboring flutes.

It will be seen that a stream of compressed gaseous fluid which starts to issue from the port 5a or 5b when the defective article 3a, 3b reaches the ejecting station B produces a separating force which crosses the path of the articles 3a, 3b at a point which coincides with the right-hand end of the station B and with the locus of the respective defective article 3a or 3b. The groove 5a or 5b of the control means or valve plate 14 then insures that the point of application of the force furnished by the stream of compressed gaseous fluid moves along the path for the articles 3a, 3b at the exact speed of such articles and through a predetermined distance (b) which substantially exceeds the distance between the centers of a pair of neighboring flutes. In the apparatus of FIG. 1, the separating force is furnished by a gaseous fluid.

Figure 11:
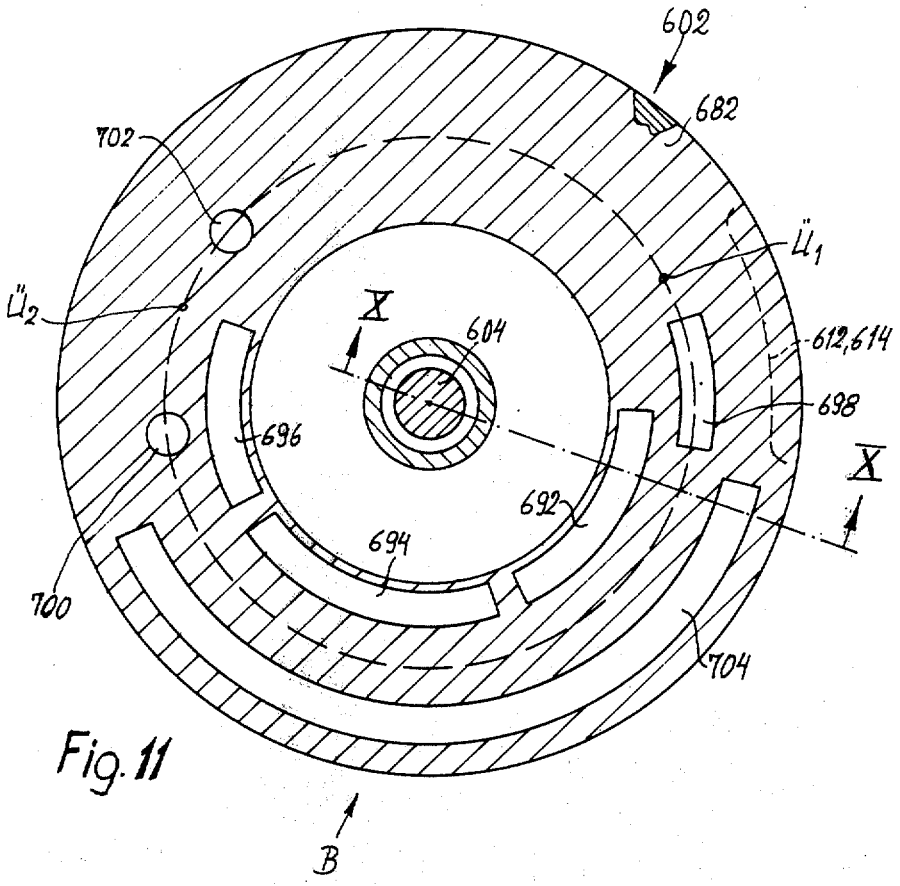
FIG. 11 is a smaller-scale transverse vertical sectional view as seen in the direction of arrows from the line XI—XI of FIG. 10.

An advantage of the apparatus of FIG. 1 is that it can employ readily available, rugged and reliable components which can insure segregation or ejection of selected articles even though the article which is to be segregated is flanked by two articles which should not be removed from the drum 1 during travel through the ejecting station B. The parts which respond to signals from the output 6 of the detector 4 need not be as sensitive as the aforediscussed components of certain presently known ejecting apparatus because they can effect ejection of selected articles within intervals which are substantially longer than the interval needed to move an article through a distance corresponding to that between the centers of two adjoining flutes 2. Thus, the ejector valves 9, 11 can be of the type which, though not as sensitive as certain recently developed electromagnetically operated valves, is capable of standing long periods of use. This is achieved by constructing the apparatus in such a way that the width b of the ejecting station B substantially exceeds the distance between the centers of two neighboring flutes 2 in the drum 1. The apparatus of the present invention is especially suited for segregation of selected articles from a series (file or row) of articles which are transported through the testing station A at the rate of at least 15 and up to 70 articles per second, i.e., at about 1,000–4,500 articles per minute. The distance between the neighboring flutes 2 is of lesser importance; such distance is selected in dependency on the dimensions of the drum 1 and certain other factors, such as the nature of devices which feed articles to the flutes at a first transfer station located upstream of the testing station and which receive satisfactory articles from the drum 1 at a second transfer station located downstream of the ejecting station. The two transfer stations (U1 and U2) are shown in FIG. 11.

Figure 2:
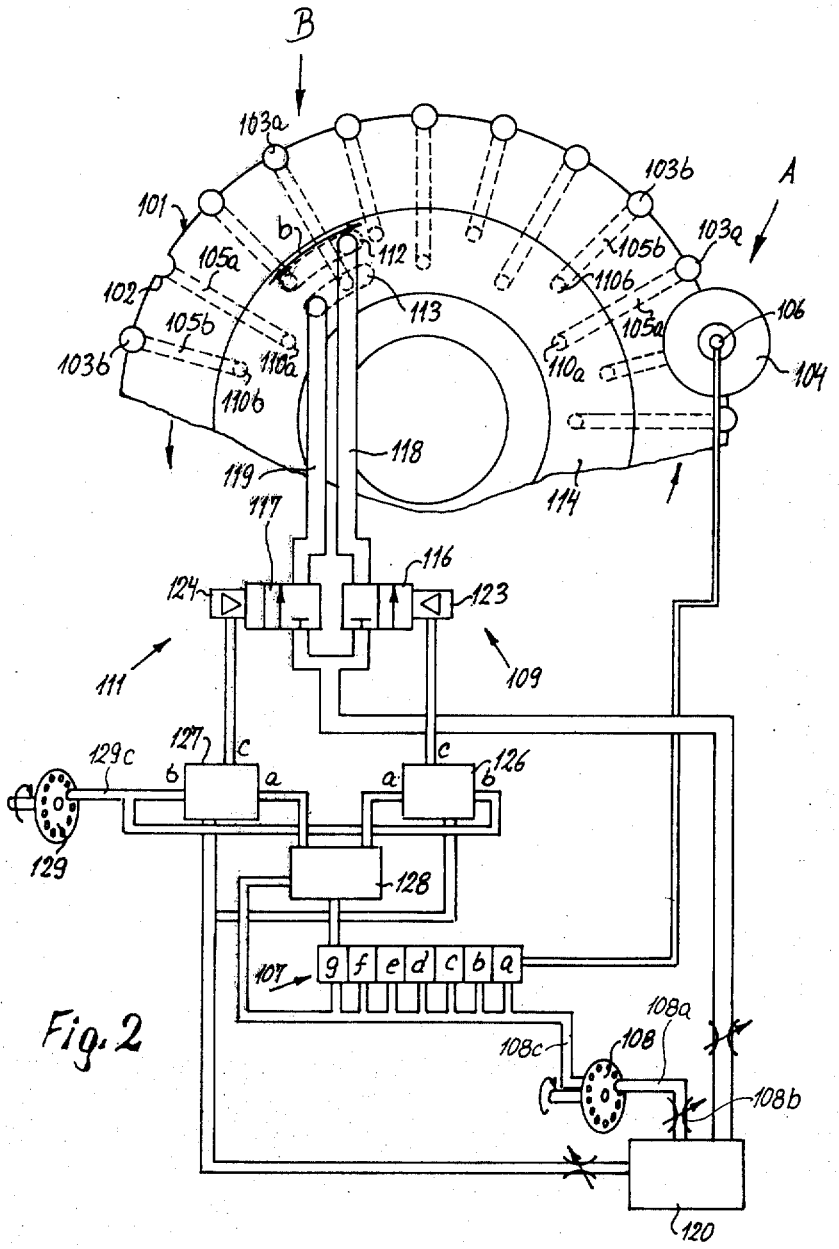
FIG. 2 is a similar fragmentary schematic elevational view of a second separating apparatus wherein the selected articles are separated by streams of a gaseous fluid in response to pneumatic signals from a testing device.

The apparatus of FIG. 2 constitutes a first modification of the apparatus of FIG. 1. All such components of the second apparatus which are clearly analogous to or identical with the corresponding components of the first apparatus are denoted by similar reference characters plus 100. In contrast to the detector 4 of FIG. 1 which generates electric signals, the output 106 of the detector 104 shown in FIG. 2 is designed to emit pneumatic signals which are transmitted to the first stage a of a pneumatic shift register 107. The pneumatic elements of the system which transmits signals from the detector 104 to the ejector valves 109, 111 of the ejector unit in the apparatus of FIG. 2 are available on the market and are produced by the Corning Glass Works, Corning, N.Y. The pulse generator 108 comprises a disk which is rotated in synchronism with the drum 101 and has apertures which transmit pneumatic pulses from a conduit 108a (which contains an adjustable flow restrictor 108b and is connected with the source 120 of compressed gas) to a conduit 108c which transmits pulses to the stages a, b, c, d, e, f, g of the shift register 107. The timer 129 also comprises a disk which is provided with apertures and rotates at half the speed of the disk of the pulse generator 108. A first conduit (not shown) which is connected with the source 120 transmits pneumatic signals to a second conduit 129c which is connected with the inputs b of two pneumatic flip-flops 126, 127. The inputs a of the flip-flops 126, 127 are connected with the corresponding outputs of the pneumatic switching device 128 which receives a signal from the last stage g of the shift register 107 when the detector 104 at the station A detects a defective article 103a or 103b. The outputs c of the flip-flops 126, 127 are respectively connected with the actuating elements 123, 124 of the ejector valves 109, 111 which comprise valve members 116, 117 movable to open positions to thereby connect the source 120 with the conduit 118 or 119, i.e., with the groove 112 or 113 of the control means or valve plate 114.

The operation of the apparatus of FIG. 2 is analogous to the operation of the apparatus of FIG. 1. Thus, the valve members 116, 117 can establish a connection between the source 120 and the grooves 112, 113 for intervals of time whose length corresponds to the length of the interval during which a flute 102 containing a defective article 103a or 103b moves through the ejecting station B having a width b which equals or approximates twice the distance between the centers of two neighboring flutes 102. The grooves 112, 113 enable the channels 105a, 110a or 105b, 110b to move the point where the stream of compressed gaseous fluid crosses the path for the articles 103a, 103b along such path, through the distance b, and at the exact speed of the flutes 102 so that a defective article 103a or 103b is subjected to the action of the separating force produced by the stream of compressed fluid as soon as it reaches the station B and until it leaves the respective flute 102, not later than at the left-hand end of the station B.

Figures 3, 9B:
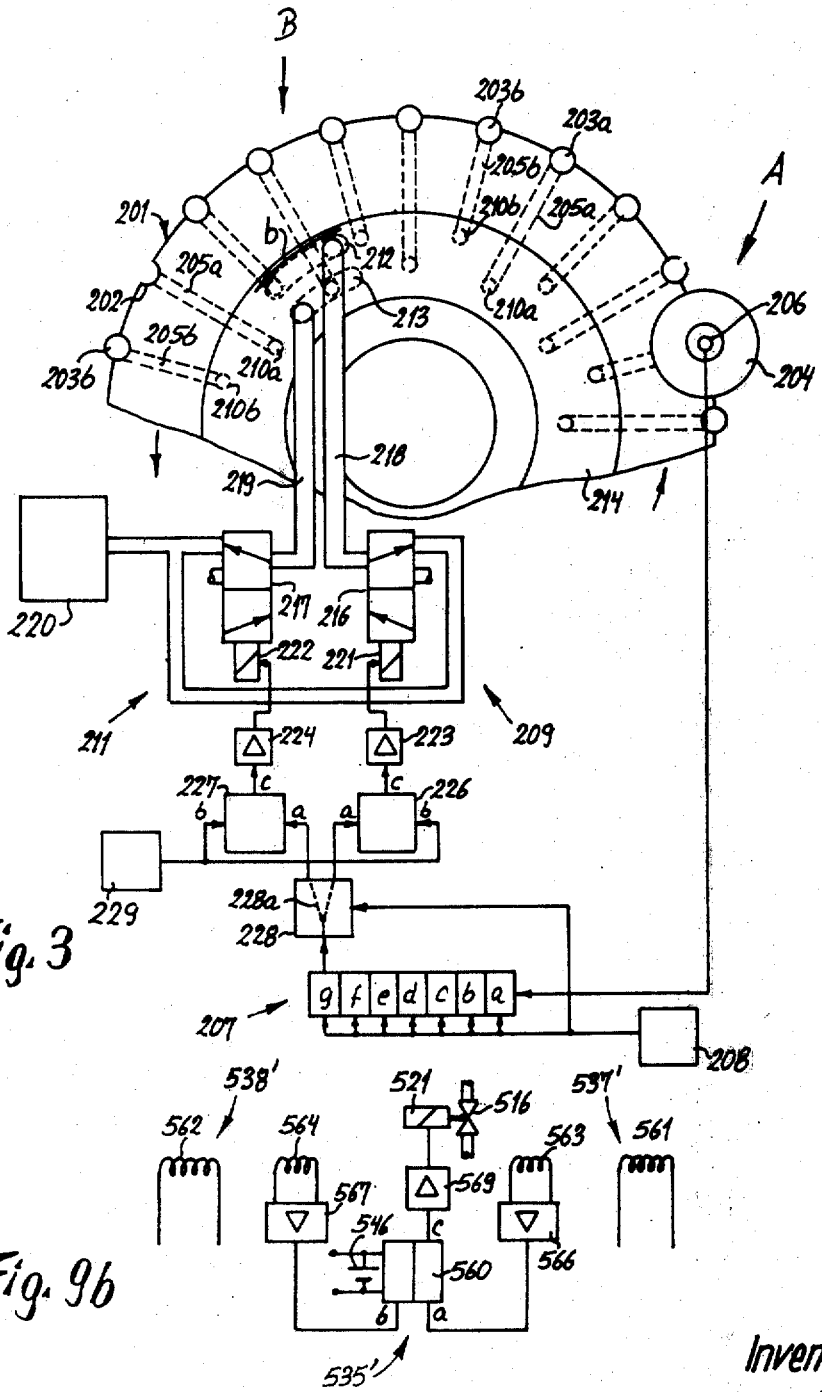
FIG. 3 is a similar fragmentary elevational view of a third apparatus wherein the selected articles are separated under the action of gravity and/or centrifugal force in response to termination of retention of such articles by suction.
FIG. 9b illustrates a portion of a second signal transmitting system for use in the apparatus of FIGS. 7 and 8.

The apparatus of FIG. 3 differs from the first two separating apparatus in that the ejection of defective articles 203a or 203b at the station B takes place under the action of a mechanical separating force, such as the force of gravity and/or centrifugal force. The articles 203a, 203b are normally held in their flutes 202 by a retaining force which is produced by suction and is stronger than the mechanical separating force. The retaining force is terminated when a defective article reaches the ejecting station B. All such parts of the apparatus of FIG. 3 which are clearly analogous to or identical with the corresponding parts of the first apparatus are denoted by similar reference characters plus 200. The centrifugal force will act on the defective articles 203a or 203b irrespective of the location of the ejecting station B. It is preferred to place this station adjacent to the lower half of the drum 201 so that the ejection of defective articles can be assisted by gravity. As a rule, the centrifugal force is strong enough to insure ejection of defective articles at the station B because the drum 201 is assumed to be driven at a high speed, for example, at the speed which is required to transport 4,000 plain cigarettes of unit length or filter cigarettes of unit length per minute through the ejecting station B.

The source 20 of FIG. 1 is replaced with a suction generating device 220 and the valve members 216, 217 are arranged to close in response to reception of signals from the amplifier 223 or 224. Thus, the ejector valves 209, 211 are normally open so that the suction generating device 220 is normally connected with the grooves 212, 213 of the valve plate 214. When the valve members 216, 217 respectively seal the suction generating device 220 from the grooves 212, 213, they automatically connect the conduits 218, 219 with the atmosphere (or with a source of compressed air) to insure a rapid rise of gas pressure in that flute 202 which travels through the ejecting station B.

Otherwise, the operation of the apparatus of FIG. 3 is identical with the operation of the first and second apparatus. The detector 204 at the testing station A is assumed to be identical with the detector 4 of FIG. 1, i.e., its output 206 transmits electrical signals which are transported through the stages a to g of the shift register 207 and are transmitted to the input a of the flip-flop circuit 226 or 227 depending on the position of the element 228a of the switching circuit 228. The electromagnets 221, 222 are energizable or deenergizable to thereby move the respective valve members 216, 217 to such positions that the suction generating device 220 is sealed from the grooves 212, 213 of the control means or valve plate 214 and that the conduit 218 or 219 is connected with the atmosphere or with a source of compressed gas to insure rapid expulsion of a defective article 203a or 203b from that flute 202 which is transported along the ejecting station B.

In this embodiment of the invention, the point of application of the mechanical separating force (gravity and/or centrifugal force) also travels along the path for the articles 203a, 203b at the exact speed of such articles and through a distance (b) which substantially exceeds the distance between the centers of two neighboring flutes 202. The main difference between the embodiment of FIG. 3 and the embodiments of FIGS. 1 and 2 is that defective articles 203a or 203b are separated from the remaining articles by a force which can act on all of the articles and as long as the articles travel along the path defined by the drum 201. However, the mechanical separating force is normally opposed and overcome by the retaining force which is produced by suction and which is automatically terminated when a defective article 203a or 203b reaches the station B so that the mechanical separating force can take over and acts on the defective article during travel along that portion of the path which extends through the ejecting station B.

Figure 4:
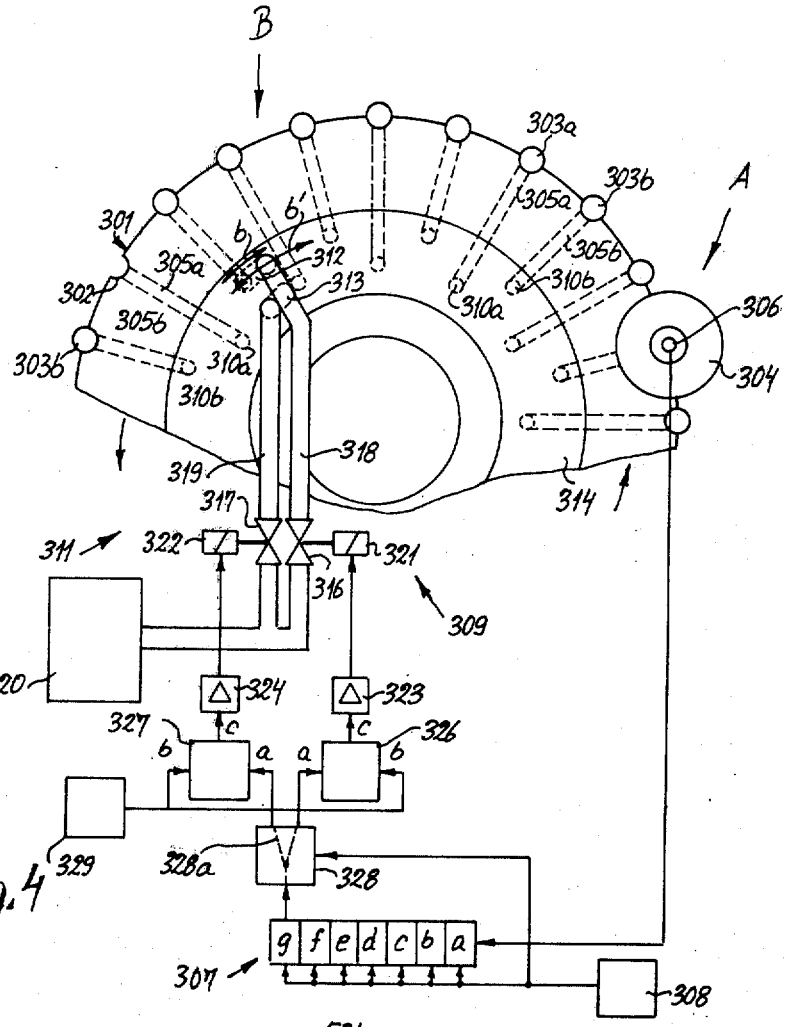
FIG. 4 is a similar schematic fragmentary elevational view of a fourth apparatus which constitutes a modification of the apparatus shown in FIG. 1.

The apparatus of FIG. 4 differs from the apparatus of FIG. 1 in that the length b of the grooves 312, 313 in the stationary control means or valve plate 314 is less than the width b′ of the ejecting station B. The electromagnets 321, 322 of the ejector valves 309, 311 are designed to maintain the respective valve members 316, 317 in open positions for intervals whose length corresponds to the length of the interval which is required to transport a flute 302 of the drum 301 through the entire ejecting station B. The width b′ of the station B nearly equals twice the distance between the centers of two neighboring flutes 302 whereas the length b of the groove 312 or 313 equals or approaches such distance. Thus the width b′ is slightly less than or equals 2b.

All such parts of the apparatus shown in FIG. 4 which are clearly analogous to or identical with the corresponding parts of the apparatus of FIG. 1 are denoted by similar reference characters plus 300.

An advantage of the apparatus of FIG. 4 is that the valve member 316 or 317 moves to open position before the channel 310b or 310a which communicates with the flute 302 carrying a defective article 303b or 303a begins to communicate with groove 312 or 313. This enables the gas stream which issues from the source 320 to build up in the groove 312 or 313 a substantial pressure and to effect an abrupt ejection of a defective article 303a or 303b while the respective flute [ 202 ] *302* communicates with the groove 313 or 312.

It will be seen that the apparatus of FIG. 4 is clearly analogous to the apparatus of FIGS. 1–3. Even though the ejection of defective or selected articles 303a or 303b takes place during an interval which is shorter than the interval required for transport of articles through a distance corresponding to several times the distance b between the centers of two neighboring flutes, at time which is available for ejection or segregation of defective or selected articles is that time during which a flute covers the distance b′, namely, a distance which considerably exceeds the distance b between the centers of two neighboring flutes 302.

Figure 5:
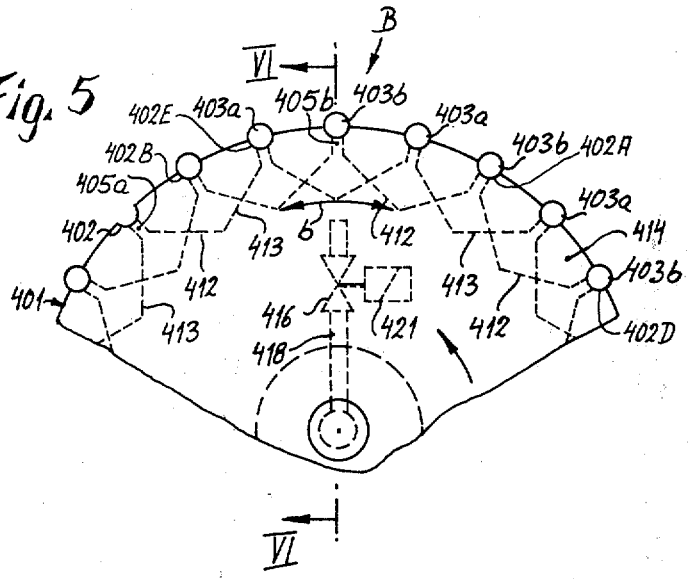
FIG. 5 is an elevational view of a portion of a fifth apparatus wherein the ejecting means comprises a pair of stationary ejectors mounted in the interior of the conveyor.
Figure 6:
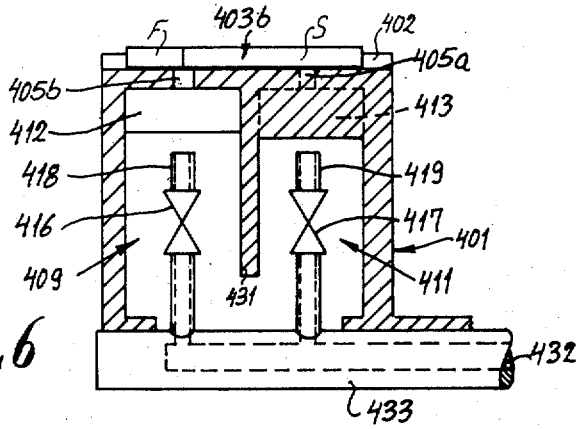
FIG. 6 is a sectional view as seen in the direction of arrows from the line VI—VI of FIG. 5.

The apparatus of FIGS. 5 and 6 does not have a discrete control means or valve plate. Such valve plate is replaced by an integral part of the drum 401, i.e., the control means moves with the conveyor for the articles. Alternate flutes 402 of the drum 401 communicate with recesses or grooves 412, 413 which are angularly offset with reference to each other (as considered in the circumferential direction of the drum) by a distance corresponding to that between the centers of two neighboring flutes. The recesses 412 form a first circle, the recesses 413 form a second circle (see FIG. 6), and the two circles are partly separated from each other by a radially inwardly extending partition or baffle 431 of the drum 401. Each of the recesses 412, 413 tapers radially outwardly toward the respective flute 402 and communicates with such flute by a relatively short radial port 405a, 405b. The partition 431 prevents excessive flow of compressed air from the space which communicates with the recesses 412 into the space which communicates with the recesses 413 or vice versa. Thus, the partition 431 forms part of a moving control means which insures that the point of application of a separating force travels with the flute 402 for the selected article while such flute travels along the ejecting station B. The supply conduits 418, 419 for compressed air are stationary and are secured to a shaft 433 on which the drum 401 rotates. The shaft 433 has an axial bore 432 which connects the supply conduits 418, 419 with a source of compressed air. The valve members 416, 417 of the ejector valves 409, 411 in the conduits 418, 419 are normally closed. They open in response to pneumatic or electric signals from the detector (not shown) to admit compressed air into the adjacent recess 412 or 413, depending upon whether the defective article which has caused the generation of a signal is one of the articles 403b or 403a. These articles are assumed to be filter cigarettes of unit length each having a wrapped tobacco filler rod section S and a filter plug F (see FIG. 6). The remaining parts of the testing apparatus are assumed to be constructed and assembled in a manner as shown in FIG. 1. Thus, the apparatus employs a detector 4, a shift register 7, and a source 20 of compressed gas. The numeral 421 denotes the electromagnet of the ejector valve 409.

When the valve member 416 of the ejector valve 409 is caused by the electromagnet 421 to assume its open position in response to a signal from the detector at the testing station, the supply conduit 418 directs a stream of compressed gas into the adjacent recess 412 communicating with that flute 402 which contains the defective article 403b (i.e., that article which has caused the generation of the signal for opening of the valve 409). Since the inner end of the recess 412 at the ejecting station B is much wider than its outer end (the maximum width b of the recesses 412, 413 approximates twice the distance between the centers of neighboring flutes 402 and equals the width of the station B), the admission of compressed gas into the recess 412 at the station B is maintained for an interval of time which is long enough to effect ejection of the defective article 403b. As shown in FIG. 6, the channel or port 405b between the recess 412 and the flute 402 at the ejecting station B directs the stream of compressed gas against the filter plug F of the defective article 403b, and the separating force furnished by such stream is strong enough to effect expulsion or separation of the defective article while the corresponding recess 412 travels through the station B. The baffle 431 prevents the flow of compressed gas into the adjoining recesses 413 and the special configuration of the recesses 412, 413 insures that the stream of gas which is directed into the recess 412 at the station B cannot dislodge the neighboring (satisfactory) articles 403b (in the flutes 402A, 402B of FIG. 5).

If the article 403a which follows the freshly ejected article 403b is also defective, the valve member 417 of the ejector valve 411 opens when such article 403a reaches the ejecting station B so that the supply conduit 419 directs a stream of compressed gas into the respective recess 413. The respective channel or port 405a then directs the stream of compressed gas against the tobacco filler rod section S of the defective article 403a and insures the expulsion of such article while the corresponding recess 413 travels through the ejecting station B. Such stream of gas cannot dislodge the satisfactory articles 403a in the neighboring flutes 402D, 402E.

Each of the apparatus shown in FIGS. 1–6 comprises an ejector unit or segregating unit with two discrete ejectors, such as the valves 9, 11 of FIG. 1, whereby one ejector serves to segregate defective articles in the evenly numbered flutes of the drum and the other ejector serves to segregate defective articles in the oddly numbered flutes of the drum. It is clear, however, that the improved apparatus can be modified to have three, four or more ejectors for segregation of defective or selected articles in each third, fourth, etc. flute and that the thus modified apparatus then includes an ejecting or segregating station whose width approaches three, four, etc. times the distance between the centers of two neighboring flutes. Such apparatus must employ more complicated drums and more complicated systems for transmission of signals from the detector to the respective ejector valves. Referring specifically to FIG. 1, the apparatus therein shown could be provided with three ejector valves, three flip-flops and a more complicated switching circuit which would insure energization of the proper electromagnet when a defective article reaches the ejecting or segregating station whose width is then approximately three times the distance between two neighboring flutes. Such apparatus must employ a different control means, e.g., a valve plate with three grooves located at different distances from the axis of the drum, and the drum must be provided with three sets of radial channels or ports and with three sets of axially extending bores or channels.

It is further clear that the apparatus of the present invention need not be used exclusively for the segregation or ejection of defective articles. Thus, it is often desirable to segregate from a row of cigarettes, cigars, cigarillos, cheroots or filter rod sections each second, third, etc. article not because the articles to be segregated are defective but because the single row is to be converted into two, three or more rows. Furthermore, the apparatus can be used for segregation of each n-th article for the purpose of testing in a separate apparatus, i.e., the apparatus of the present invention then merely constitutes a means for segregating from a series of closely adjacent rapidly moving equidistant articles each n-th article for the purpose of inspection or testing at a station which is not located upstream of the ejecting or segregating station. Also, the apparatus can be used to transfer each n-th article between a conveyor (e.g., the drum 1 of FIG. 1) wherein the articles travel sideways and a conveyor whereon the articles travel lengthwise. Each n-th article can be removed from the drum 1 for immediate transfer onto a testing conveyor where the thus removed articles are tested in the same way as *at* the station A of FIG. 1 or by resorting to other types of testing devices.

The apparatus of FIGS. 7 and 8 differs from the apparatus of FIGS. 1–6 in that the drum 501 carries a large number of ejector valves 509, one for each flute 502, and that the ejector valves 509 orbit about the axis of the drum 501 at the speed of the articles 503 so that each valve 509 remains in permanent registry with the respective flute 502. The valve member 516 of each ejector valve 509 can be moved to open position in response to energization of the corresponding electromagnet 521. The ejector valves 509 are installed in supply conduits 518 which can discharge streams of compressed gas into the respective flutes 502 of the drum 501. Each supply conduit 518 communicates with an axially parallel channel 518a of the drum 501. Each channel 518a has an open end at the right-hand end face of the drum 501, as viewed in FIG. 8, and communicates with an arcuate groove 534 of a stationary valve plate 536 which is in sealing engagement with the adjacent end face of the drum 501 and is connected with a source 520 of compressed gas. The groove 534 is always filled with compressed gas and such gas can flow through a channel 518a and the corresponding supply conduit 518 when the respective electromagnet 521 receives a signal to move the corresponding valve member 516 to the open position. It will be noted that the supply conduits 518 replace the ports or channels of the drums shown in FIGS. 1 to 6.

The electromagnets 521 are energizable and deenergizable by discrete signal transmitting circuits 535 which rotate with the drum 501 and are connected with a source of electrical energy by means of conductors 544, slip rings 541 on the drum 501, and stationary brushes 543. The drum 501 rotates about the axis of a stationary shaft 542 which supports the valve plate 536. A first signal transmitting device 537 is adjacent to the path of the signal transmitting circuits 535 and can cause a selected signal transmitting circuit to energize the respective electromagnet 521 in response to a signal from the detector, not shown. A second signal transmitting device 538 causes the selected circuit 535 to deenergize the respective electromagnet 521 with a predetermined delay following the energization of the corresponding ejector valve.

As shown in FIG. 7, the length of the groove 534 in the valve plate 536 corresponds to three times the distance between the centers of two neighboring flutes 502 and determines the width of the ejecting or segregating station B. The signal transmitting devices 537, 538 are respectively located upstream and downstream of the station B, as considered in the direction of rotation of the drum 501 (clockwise, as the parts appear in FIG. 7). Energy storing devices 546 (e.g., batteries or capacitors) are connected in parallel with the signal transmitting circuits 535.

Figure 9A:
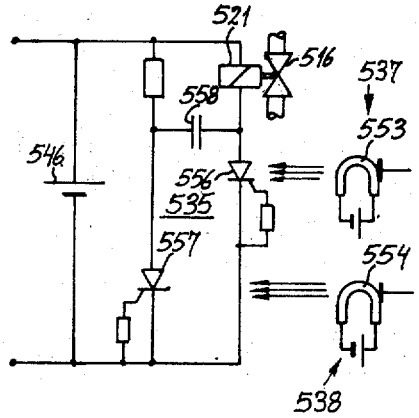
FIG. 9a illustrates a portion of a first signal transmitting system for use in the apparatus of FIGS. 7 and 8.

The construction of the signal transmitting devices 537 and 538 is shown in FIG. 9a. The device 537 comprises a light source 553 (e.g., a flashtube or a light-emitting diode) which produces a beam of light in response to a signal from the detector (such as the detector 4 of FIG. 1) and thereby causes a light sensitive element or receiver 556 (e.g., a photothyristor) of the adjacent control circuit 535 to generate a signal which causes energization of the corresponding electromagnet 521. The signal transmitting device 538 comprises a light source 554 which is preferably identical with the light source 553 and can produce a light beam with a predetermined delay following the emission of a beam of light by the source 553 to thereby cause a second light sensitive element or receiver 557 of the adjacent circuit 535 to effect deenergization of the respective electromagnet 521. The light sources 553, 554 can be said to constitute two contactless initiators or switches which can respectively cause completion and opening of the circuit of a selected electromagnet 521 in response to signals from the detector. The transmission of signals from the detector to the light source 553 is delayed in such a way that the flute 502 containing that defective article which has caused the generation of a signal during travel through the testing station moves into registry with the light source 553 when the latter energizes the respective electromagnet 521. The corresponding valve member 516 then moves to its open position and the supply conduit 518 begins to receive a stream of compressed gas as soon as the corresponding channel 518a reaches the groove 534 of the valve plate 536.

As mentioned before, the light source 554 can be caused to produce a beam of light with a predetermined delay following the emission of light by the light source 553. However, it is equally within the purview of the invention to provide for the light source 554 a circuit which causes the light source 554 to direct a beam of light against each successive receiver 557 irrespective of whether or not the circuit of the light source 553 was completed by a signal from the detector.

The operation of the apparatus of FIGS. 7, 8 and 9a is as follows:

If a defective article 503 reaches the testing station (not shown), the detector at such station transmits a signal which causes completion of the circuit of the light source 553 (signal transmitting device 537) with a delay which is required to transport the defective article 503 to the ejecting station B. The light source 553 transmits a signal to the adjacent receiver 556 which causes energization of the electromagnet 521 for that valve member 516 which controls the admission of compressed gas into the flute 502 for the defective article 503. The valve member 516 moves to its open position and allows a stream of compressed gas to flow from the source 520, through the groove 534 of the valve plate 536 and through the respective supply conduit 518 as soon as the respective channel 518a moves into registry with the front end of the groove 534. The ejection of the defective article 503 from its flute 502 can take place at any moment during the period of travel of the respective channel 518a past the stationary groove 534. The means for delaying the transmission of signals from the detector to the light source 553 may comprise a shift register or any other suitable time delay means. In the embodiment of FIGS. 7 and 8, the length of the groove 534 is such that the ejection of a defective article 503 can take place during an interval which is required to transport a flute 502 through a distance corresponding to, approximating or even exceeding three times the distance between the centers of two neighboring flutes. When the respective receiver 557 reaches the light source 554 (signal transmitting device 538), the source 554 transmits a photosignal which causes the receiver 557 to deenergize the electromagnet 521 shortly after the respective channel 518a moves beyond the groove 534 of the valve plate 536. The deenergization of the electromagnet 521 takes place in response to discharge of a capacitor 558 which discharges in response to illumination of the receiver 557 by light issuing from the source 554.

It will be seen that the apparatus of FIGS. 7, 8, 9a can effect segregation of selected articles 503 during travel of such articles through a distance which is more than twice the distance between two neighboring flutes 502 and in such a way that the ejection of a selected article 503 in no way influences the retention of the adjoining articles in their flutes.

FIG. 9b illustrates two inductive signal transmitting devices 537′, 538′ which can be used in the apparatus of FIGS. 7, 8 as substitutes for the devices 537, 538 of FIG. 9a. The devices 537′, 538′ respectively comprise stationary coils 561, 562 which respectively serve to transmit signals for energization and deenergization of selected electromagnets 521.

Each signal transmitting circuit 535′ on the drum comprises two coils 563, 564 which are respectively connected by way of amplifiers 566, 567 with the inputs a and b of a signal storing device or circuit 560 of known construction. The output c of the signal storing device 560 is connected with the respective electromagnet 521 by way of a further amplifier 569. The output c transmits a signal to the amplifier 569 to energize the electromagnet 521 and to move the corresponding valve member 516 to its open position in response to transmission of a signal to the input a of the signal storing device 560. The signal at the output c disappears in response to transmission of a signal to the erasing input b of the signal storing device 560.

When the detector at the testing station of the apparatus shown in FIGS. 7 and 8 detects the presence of a defective article 503, the signal from the output of such detector is transmitted to the circuit of the coil 561 with a requisite delay whereby the current flowing through the coil 561 induces a voltage signal in the approaching winding 563 of that signal transmitting circuit 535′ which is associated with the ejector valve 509 for the flute 502 containing the defective articles 503 (namely, that article which has caused the generation of a signal at the testing station). The signal from the winding 563 is amplified at 566 and is transmitted to the input a of the signal storing device 560. The output c of the signal storing device 560 transmits a signal to the amplifier 569 which energizes the electromagnet 521 to move the valve member 516 to the open position whereby the respective supply conduit 518 begins to receive a stream of compressed gas as soon as the corresponding channel 518a reaches the front end of the groove 534 in the stationary valve plate 536. The defective article 503 is segregated while the respective flute 502 travels through the ejecting or segregating station B, i.e., while the flute covers a distance which is several times the distance between the centers of two neighboring flutes.

The winding 564 of the signal transmitting circuit 535′ then reaches the winding 562 of the signal transmitting device 538′ which induces in the winding 564 a voltage signal. Such signal is amplified at 567 and is transmitted to the input b of the signal storing device 560 which terminates the transmission of signal to the amplifier 569. Thus, the electromagnet 521 is deenergized and the valve member 516 reassumes its closed position.

Figure 10:
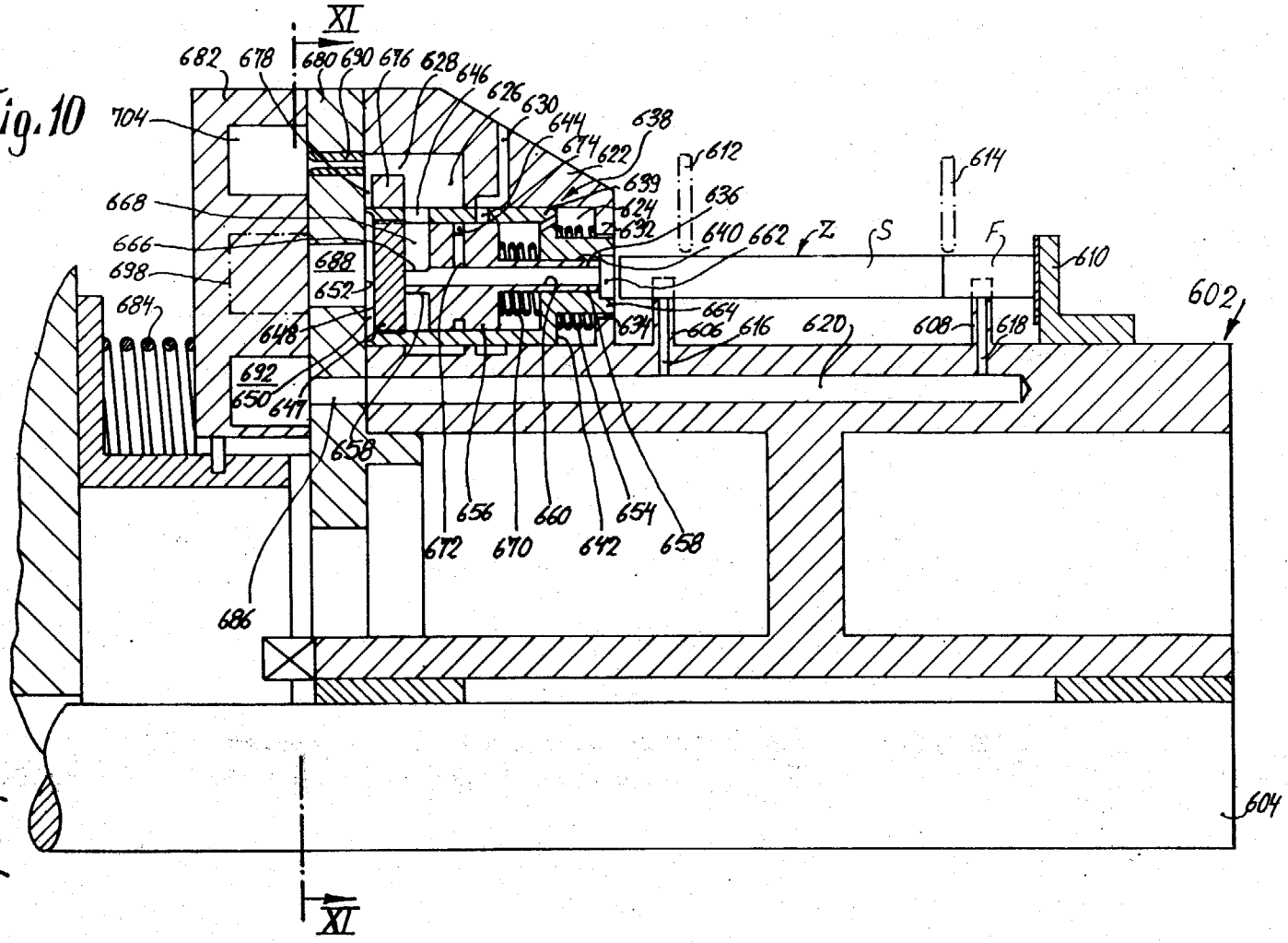
FIG. 10 is a fragmentary axial sectional view of a conveyor forming part of a seventh separating apparatus wherein the articles are normally retained by mechanical means, the sections being taken in the direction of arrows as seen from the line X—X of FIG. 11.

The apparatus of FIGS. 10 and 11 differs from the apparatus of FIGS. 1 to 8 in that the rod-shaped articles Z are normally held by a mechanical retaining force and that the application of such mechanical retaining force is terminated in response to signals from a detector to thereby permit segregation of the article (which has caused the generation of a signal) by pneumatic means, by the action of gravity and/or by the action of centrifugal force.

The apparatus of FIGS. 10 and 11 comprises a conveyor or drum 602 which is rotatable on a stationary shaft 604 and carries on its periphery a set of equidistant receiving means for the articles Z and a set of testing units for such articles. It is assumed that the articles Z are filter cigarettes of unit length each of which has a wrapped tobacco filler rod section S and a filter tip F. Each receiving means comprises two aligned fluted receiving members 606, 608 which can receive an article Z so that the latter's axis is parallel to the axis of the drum 602. The filter tips F of the articles Z are adjacent to a ring-shaped flange or abutment 610 of the drum 602. The articles Z are temporarily held in the flutes of the receiving members 606, 608 by two arcuate shrouds or retaining members 612, 614 which are indicated in FIG. 10 by phantom lines. The centers of curvature of the shrouds 612, 614 are located on the axis of the shaft 604 (see FIG. 11). The purpose of the shrouds 612, 614 is to hold the articles against ejection from the respective receiving members 606, 608 under the action of gravity and/or centrifugal force while the articles travel along predetermined portions of their path.

Each receiving member 606 of the drum 602 is provided with a radially extending suction channel or port 616 and each receiving member 608 is provided with a radially extending suction channel or port 618. The ports 616, 618 for each pair of aligned receiving members 606, 608 communicate with discrete axially parallel channels or bores 620 of the drum 602. The receiving members 606 are adjacent to a housing 622 which is provided on the drum 602 and accommodates a plurality of testing units, one for each pair of receiving members 606, 608. The housing 622 has a set of cylindrical bores 624, one for each receiving member 606 and adjacent to the right-hand end of the housing, as viewed in FIG. 10. Each bore 624 communicates with a larger diameter bore 626 which in turn communicates with a channel 628 for admission of a testing fluid. Each bore 624 further communicates with a discrete channel 630 which can discharge testing fluid into the atmosphere.

The front end wall 632 of the housing 622 has a set of openings 634 for the heads 636 of working pistons 638 which are reciprocable in the respective bores 624. The head 636 of each piston 638 has a bore 640 and extends forwardly from a ring-shaped shoulder 642 of the respective piston. Each piston 638 further comprises a shank 639 which extends rearwardly from the respective shoulder 642, as viewed in FIG. 10. Each shank 639 is formed with two channels 644, 646 the first of which constitutes an extension of the respective channel 630. The left-hand or rear channel 646 of the shank 639 is located in the region of the respective larger-diameter bore 626. The rear end of each piston 638 is sealed by a closure or plug 647 which is in mesh with the internally threaded left-hand end portion of the respective shank 639. The outer surface 648 of each plug 647 is provided with a shallow depression or recess 650 and defines with an adjacent disk-shaped wall 680 of the housing 622 a compartment 652. The shoulder 642 of each working piston 638 abuts against one end convolution of a helical spring 654 which reacts against the inner side of the front end wall 632 of the housing 622.

Each working piston 638 accommodates a testing piston 656 which has a tubular plunger 658 provided with an axially extending bore 660. The front end of each bore 660 communicates with the recess 662 of a mouthpiece 664 in the head 636 of the respective working piston 638. Each testing piston 656 forms part of a retaining device for the adjacent article Z. The other or rear end of each bore 660 communicates with a port 666 in the wall of the respective piston 656 and the port 666 communicates with a compartment 668. The channels 646 connect the compartments 668 with the respective bores 626. It can be said that each testing unit in the housing 622 comprises a first testing chamber which constitutes the compartment 668 and a second testing chamber including the bore 626 and the compartment 652. The bores 626 are in temporary communication with the respective compartments 652 during each revolution of the drum 602. The front end face of each testing piston 656 is biased by a discrete helical spring 670 which reacts against the inner end of the head 636 of the respective working piston 638. The purpose of the springs 670 is to bias the pistons 656 against the respective plugs 647 so that the front end faces of the plungers 658 are flush with the bottom surfaces in the respective recesses 662.

A venting or aerating orifice 672 extends radially outwardly from the bore 660 of each testing piston 656 so that it can communicate with an annular channel 674 of the respective piston 683.

The rear portion of each working piston 638 is guided in a portion 676 of the housing 622. The housing portion 676 is located in front of connecting channels 678 which establish communication between the bores 626 and the respective compartments 652 when the corresponding working pistons 638 move forwardly whereby the thus connected bore 626 and compartment 652 constitute the second testing chamber of the respective testing unit. The outer side of the rear wall 680 of the housing 622 on the drum 602 abuts against a stationary control means or valve plate 682 which is biased against the drum by a strong helical spring 684. The right-hand surface of the valve plate 682 (as viewed in FIG. 10) is provided with several arcuate grooves which are best shown in FIG. 11. The centers of curvature of such grooves in the valve plate 682 are located on the axis of the shaft 604. The wall 680 has an annulus of axially parallel bores 686 each of which communicates with a channel 620 and travels along arcuate grooves 692, 694, 696 (FIG. 11) of the valve plate 682 when the drum 602 rotates. A second annulus of bores 688 in the wall 680 can communicate with an arcuate groove 698 of the valve plate 682; the bores 688 communicate with the respective compartments 652. The channels 628 can communicate with an arcuate groove 704 of the valve plate 682 by way of exchangeable flow restrictors 690 in the wall 680, one for each testing unit.

The groove 698 of the valve plate 682 is located radially outwardly of the grooves 692, 694, 696 but radially inwardly of the groove 704. The grooves 692, 696 are connected with a suction generating device and the median groove [ 692 ] *694* is connected with a source of compressed air. The length of the median groove 694 corresponds to at least twice the distance between a pair of neighboring receiving members 606 or 608 on the periphery of the drum 602. The groove 698 of the valve plate 682 is located at the same distance from the axis of the shaft 604 as two bores 700, 702 of the valve [ member ] *plate*. The bore 700 can connect the compartments 652 with the atmosphere. The bore 702 is connected with a source of compressed air which can be admitted into the axial bores 660 to expel therefrom dust, particles of tobacco or other foreign matter. The groove 704 can communicate with the passages of the flow restrictors 690 and is connected with a source of testing fluid.

The operation of the apparatus of FIGS. 10 and 11 is as follows:

Successive pairs of axially aligned receiving members 606, 608 receive articles Z at a transfer station U1 shown in FIG. 11. Such articles are immediately moved along the inner sides of the retaining shrouds 612, 614 so that they cannot leave the flutes of their receiving members under the action of centrifugal force and/or gravity. The means for feeding articles Z at the transfer station U1 may comprise a conventional transfer drum of the type well known from the art of filter cigarette making machines or filter plug making machines.

The bore 688 for the corresponding testing unit in the housing 622 on the drum 602 thereupon moves into registry with the arcuate groove 698 of the valve plate 682. The groove 698 is connected with a source of compressed gaseous fluid (e.g., air) which penetrates through the respective bore 688 and enters the compartment 652 to move the corresponding working piston 638 in a direction to the right, as viewed in FIG. 10. The piston 638 stresses the corresponding spring 654 whereby an internal shoulder of the respective mouthpiece 664 shifts the freshly transferred article Z axially so that the filter plug F of such article abuts against the flange 610 of the drum 602. The free end of the wrapped tobacco filler rod section S of the article Z enters the respective mouthpiece 664 and is sealed from the atmosphere.

The drum 602 continues to rotate in a clockwise direction, as viewed in FIG. 11, and moves the flow restrictor 690 of the respective testing unit into registry with the long arcuate groove 704 of the valve plate 682. The groove 704 communicates with a source of compressed testing fluid (e.g., air) which passes through the flow restrictor 690, through the corresponding channel 628 and bore 626, through the channel 646 and compartment 668 and port 666 of the respective pistons 638 and 656, and into the axial bore 660 to enter the filler of the respective wrapped tobacco rod section S. The pressure of gas in the compartment 668 causes the testing piston 656 to move forwardly (in a direction to the right, as viewed in FIG. 10), and to cause its tubular plunger 658 to penetrate into the adjacent end of the filler if the filler is too soft, i.e., if the exposed end of the wrapped tobacco filler rod section [ X ] *S* contains less than a desirable quantity of tobacco shreds. When the plunger 658 is free to penetrate into the section S to such an extent that the orifice 672 and the channel 674 of the respective testing piston 656 move into registry with the channel 644 of the associated working piston 638, the article Z is defective and should be segregated from other articles on the drum 602. Such segregation takes place in the following way: When the channel 674 of the testing piston 656 moves into registry with the channel 644 of the working piston 638 (and hence with the corresponding channel 630 of the housing 622), the testing fluid is free to escape from the compartment 668 into the atmosphere. The bias of the spring 654 for the working piston 638 is stronger than the bias of the spring 670 for the corresponding testing piston 656. The spring 670 yields and permits the piston 638 to reassume its original (left-hand end) position so that the recess 662 of the mouthpiece 664 moves away from the left-hand end of the wrapped tobacco filler rod section S. The testing fluid is then free to escape into the atmosphere by way of the bore 660 in the plunger 658 of the testing piston 656. The defective article Z is segregated by gravity and/or centrifugal force because it is then located beyond the arcuate groove 698 of the valve plate 682, i.e., the ports 616, 618 of the respective receiving members 606, 608 are not connected with the suction generating device.

If the density of the free end of the filler of the section S is satisfactory, the plunger 658 cannot penetrate into the filler so that the channel 674 remains sealed from the channel 644 of the working piston 638. The satisfactory article Z is then held against ejection because the end of its section S extends into the respective recess 662 and the filter plug F is biased against the flange 610. The satisfactory article is also held by suction because the ports 616, 618 of the corresponding receiving members 606, 608 are connected with the suction generating device by way of the corresponding channel 620, the corresponding bore 686 in the wall 680, and the groove 692 of the valve plate 682. The corresponding flow restrictor 690 reaches the groove 704 of the valve plate 682 and admits testing fluid into the bore 626 of the respective testing unit in the housing 622. The quantity of such testing fluid corresponds to the quantity of fluid which can escape into the atmosphere through the pores of an article Z provided that the article is satisfactory, i.e., that the wrapper of its section S or filter plug F is without leaks. The testing fluid flows from the bore 626 into the channel 646 of the respective working piston 638 and compartment 668 to enter the bore 660 of the respective plunger 658 and to penetrate into the filler of the section S which extends into the adjacent recess 662. If the wrapper of the article Z is defective, e.g., if the wrapper has a pronounced leak, the testing fluid and the control fluid escape through the leak at the rate which exceeds the rate of admission of fresh testing fluid. This results in a drop of pressure in the compartment 652 so that the spring 654 is free to expand and returns the pistons 638 and 656 to their starting positions. The recess 662 of the mouthpiece 664 moves away from the adjacent end of the article Z so that the latter is not held in the receiving members by a mechanical retaining force. The corresponding channel 620 then moves into registry with the arcuate groove 694 of the valve plate 682. The groove 694 admits into the channel 620 compressed gas by way of the respective bore 686 in the wall 680 and the compressed gas stream expels the article whose wrapper has a leak from the flutes of the corresponding receiving members 606, 608. Such compressed gas stream is divided into two discrete streams which reach the flutes of the members 606, 608 by way of the respective ports 616, 618.

If the article Z has a filler of satisfactory density and a wrapper which is free of leaks, the rate at which the gaseous fluid escapes through the pores of the satisfactory wrapper equals the rate of admission of testing fluid by way of the channel 628 of the respective testing unit in the housing 622. Therefore, the piston 638 remains in its right-hand end position and the free end of the section S of the satisfactory article Z is received in the adjacent recess 662 while the filter plug F bears against the flange 610. The mechanical retaining force acting on the satisfactory article Z is then such that the streams of compressed gas which are admitted into the corresponding ports 616, 618 while the corresponding channel 620 moves past the groove 694 of the valve plate 682 are too weak to expel the article from its receiving members 606, 608. The channel 620 then reaches the groove 696 which is connected with the suction generating device so that the satisfactory article Z is held by suction.

The working piston 638 is retracted to its starting position to release the satisfactory article Z when the corresponding bore 688 of the wall 680 reaches the bore 700 which communicates with the atmosphere. The pressure in the compartment 652 decreases and the springs 654 and 670 expand. The satisfactory article Z is then ready to be transferred onto a further conveyor (not shown) at a second transfer station U2 shown in FIG. 11.

The corresponding bore 688 of the wall 680 then moves into registry with the bore 702 of the valve plate 682. The bore 702 admits a stream of compressed air which enters the respective bore 660 and expels fragments of tobacco or dust from the testing piston 656. This takes place before the respective receiving members 606, 608 reach the first transfer station U1. The stream which is admitted by way of the bore 702 also cleans the recess 662 of the corresponding mouthpiece 664.

It will be seen that the [mouthpiece] *mouthpieces* 664 remain in extended or retaining positions when such mouthpieces engage satisfactory articles Z, and that the mouthpieces are moved from retaining positions to retracted positions when they travel with defective articles. This insures that the action of the mechanical retaining force is terminated when a defective article reaches the ejecting station so that the defective article can be segregated by gravity and/or centrifugal force (assisted, if necessary, by the force which is furnished by a stream of compressed gas) as soon as the defective article reaches the ejecting station. The control means or valve plate 682 insures that the point of application of the separating force travels with the receiving means 606, 608 for a defective article while such receiving means travels along the ejecting station. This insures reliable segregation of the defective article while the respective receiving means 606, 608 covers a distance which is a multiple of the distance between a pair of neighboring receiving means. The width of the ejecting station corresponds to the length of the groove 694 of the valve plate 682.

An important advantage of the improved method and apparatus is that the width of the ejecting or segregating station substantially exceeds (and is preferably a multiple of) the distance between a pair of neighboring articles. This renders it possible to insure that the selected (e.g., defective) articles are reliably segregated from the remaining articles even though the components which respond to signals from a testing or other signal generating device are unable to react as rapidly as is needed to insure the segregation of selected articles within an interval which is needed to transport an article through a distance which equals that between two neighboring articles.

The apparatus of FIGS. 1–6 exhibit the advantage that the pneumatic ejector units employ parts which can stand long periods of use because they need not be designed to insure instantaneous reaction in response to reception of signals. The apparatus of FIGS. 7 and 8 is slightly more complicated; however, the length of intervals which are available for segregation of selected articles can be many times the length of that interval which is needed to transport an article through a distance equaling that between two neighboring articles. The apparatus of FIGS. 10–11 need not be provided with means for rapid transmission of signals because the testing elements themselves detect the articles which must be segregated by terminating the mechanical retaining action upon such articles. Here, too, the length of intervals which are available for separation or ejection of defective or selected articles can be many times the length of that interval which is required to transport an article through a distance corresponding to the distance between two neighboring articles.

The signals for segregation of selected (defective or satisfactory) articles can be produced at regular or irregular intervals by the machine which produces or processes the articles, for example, by a filter cigarette making machine. The separated articles can be subjected to a testing operation.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In a method of individually removing selected cigarettes or analogous rod-shaped articles from a predetermined path for a series of equidistant discrete articles moving at an elevated speed and forming at least two groups, the articles of one of said groups alternating with the articles of another of said groups and the removal of selected articles being effected by a separating force to the action of which a selected article is subjected in response to a signal, the steps of transmitting signals for removal of selected articles of said one group along a first route; transmitting signals for removal of selected articles of said other group along a second route; starting the action of said separating force in response to the thus transmitted signals and in a direction which crosses said path at a point coinciding with the locus of the respective selected article; and moving said point of application of said separating force along said path at said elevated speed and through a predetermined distance substantially exceeding the distance between a pair of neighboring articles of said series.

2. In a method as defined in claim 1, the additional steps of subjecting the articles of said series to the action of a retaining force which is stronger than said separating force and acts on the articles in a direction to retain the articles in said path, and terminating the action of said retaining force upon a selected article when such article occupies said locus.

3. In a method as defined in claim 1, wherein said separating force is a mechanical force.

4. In a method as defined in claim 3, wherein said mechanical force is the force of gravity.

5. In a method as defined in claim 3, wherein said path is an arcuate path and said mechanical force is the centrifugal force.

6. In a method as defined in claim 1, wherein said separating force is furnished at least in part by a gaseous fluid.

7. In a method as defined in claim 1, wherein said selected articles include each n-th article of said series and wherein n is a whole number exceeding 1.

8. In a method as defined in claim 7, wherein said separating force is furnished at least in part by a gaseous fluid.

9. In a method as defined in claim 7, wherein said predetermined distance is between n–1 and n times the distance between a pair of neighboring articles of said series, and wherein n is a whole number exceeding 1.

10. In a method as defined in claim 1, wherein said separating force is furnished at least in part by a compressed gaseous fluid.

11. In a method as defined in claim 10, wherein said gaseous fluid forms at least one stream which is directed against the respective selected article when such article occupies said locus, and said step of moving said point of application comprises moving the stream at said speed so that the stream continues to cross said path through said predetermined distance.

12. In a method as defined in claim 1, wherein the application of said separating force is triggered by electric signals.

13. In a method as defined in claim 1, wherein the application of said separating force is triggered by pneumatic signals.

14. In a method as defined in claim 1, the additional steps of testing the condition of successive articles upstream of said point and producing said signals in response to detection of defective articles.

15. In a method as defined in claim 1, wherein said series of articles is moved at a speed of at least 1,000 articles per minute.

16. Apparatus for individually removing cigarettes or analogous rod-shaped articles from a series of equidistant discrete articles which form at least two groups and wherein the articles of one of said groups alternate with the articles of another of said groups, comprising conveyor means arranged to move said series of articles along a predetermined path at an elevated speed, said conveyor means having equidistant receiving means for the articles of said series; ejector means actuatable to subject selected articles of said series to the action of a separating force acting transversely of said path to thereby remove said selected articles from the respective receiving means, said force being effective along a predetermined portion of said path whose length substantially exceeds the distance between a pair of neighboring receiving means; control means for moving the point of application of said separating force at said elevated speed along said predetermined portion of said path; and means for actuating said ejector means when a selected article of said series reaches said predetermined portion of said path, including means for generating signals representing selected articles of said one group and said other group, means for transmitting to said ejector means along a first route signals representing said selected articles of said one group, and means for transmitting to said ejector means along a second route signals representing said selected articles of said other group.

17. Apparatus as defined in claim 16, wherein said ejector means comprises retaining means movable to and from an operative position in which said retaining means retains the articles of said series in the respective receiving means with a second force which exceeds said separating force.

18. Apparatus as defined in claim 17, wherein said separating force is the force of gravity.

19. Apparatus as defined in claim 17, wherein said path is an arcuate path and said separating force is the centrifugal force.

20. Apparatus as defined in claim 16, wherein said ejector means comprises at least one pneumatic ejector.

21. Apparatus as defined in claim 20, wherein said ejector means comprises at least one valve.

22. Apparatus as defined in claim 16, wherein said signal generating means is arranged to furnish electric signals.

23. Apparatus as defined in claim 16, wherein said signal generating means is arranged to furnish pneumatic signals.

24. Apparatus as defined in claim 16, wherein said signal generating means comprises means for testing the articles of said series and for producing said signals in response to detection of defective articles.

25. Apparatus as defined in claim 16, wherein said actuating means is arranged to actuate said ejector means for separation of each n-th article of said series and wherein n is a whole number exceeding 1.

26. Apparatus as defined in claim 16, wherein said control means comprises a valve member having a plurality of grooves each extending along said predetermined portion of said path, said conveyor means comprising a plurality of channel means each permanently communicating with a different receiving means and communicating with one of said grooves during travel of the respective receiving means along said predetermined portion of said path, said ejector means comprising means for conveying a stream of gaseous fluid through said grooves and discrete valve means for each of said grooves, each of said valve means being movable between open and closed positions to thereby respectively permit and terminate the flow of gaseous fluid through the respective groove, said actuating means being arranged to effect movements of said valve means from one to the other position thereof when a channel means communicating with the receiving means for a selected article communicates with the respective groove.

27. Apparatus as defined in claim 26, wherein said means for conveying comprises a source of compressed gaseous fluid and said actuating means is arranged to effect movements of said valve means to open positions.

28. Apparatus as defined in claim 26, wherein said means for conveying comprises suction generating means and said actuating means is arranged to effect movements of said valve means to closed positions.

29. Apparatus as defined in claim 26, wherein the length of said grooves is between n-1 and n times the distance between a pair of neighboring receiving means and wherein n is a whole number exceeding 1.

30. Apparatus as defined in claim 26, wherein said valve member is a stationary valve plate and said conveyor means is arranged to rotate about a predetermined axis and has an end face in sealing engagement with said valve plate.

31. Apparatus as defined in claim 26, wherein said valve member is rigid with said conveyor means.

32. Apparatus as defined in claim 16, wherein said ejector means comprises a discrete ejector for each of said receiving means, said discrete ejectors being arranged to move with said conveyor means at said elevated speed so as to remain in unchanged positions with reference to the respective receiving means.

33. Apparatus as defined in claim 16, wherein said conveyor means is arranged to transport said series of articles at a speed of at least 1,000 articles per minute.

34. Apparatus for individually removing cigarettes or analogous rod-shaped articles from a series of equidistant discrete articles, comprising conveyor means arranged to move said series of equidistant articles along a predetermined path at an elevated speed, said conveyor means having equidistant receiving means for the articles of said series; ejector means actuatable to subject selected articles of said series to the action of a separating force acting transversely of said path to thereby remove said selected articles from the respective receiving means, said force being effective along a predetermined portion of said path whose length substantially exceeds the distance between a pair of neighboring receiving means; control means for moving the point of application of said separating force at said elevated speed along said predetermined portion of said path; signal generating means for actuating said ejector means when a selected article of said series reaches said predetermined portion of said path; and means for transmitting signals from said signal generating means to said ejector means, including a shift register arranged to transport signals in synchronism with movements of the respective selected articles and means for transmitting signals from said shift register to said ejector means when the selected articles reach said predetermined portion of said path.

35. Apparatus as defined in claim 34, wherein said means for transmitting signals from said shift register to said ejector means comprises cooperating first and second signal transmitting portions respectively provided on said conveyor means and adjacent to said conveyor means and being out of contact [ from ] *with* each other.

36. Apparatus as defined in claim 35, wherein said signal transmitting portions include photosensitive means.

37. Apparatus as defined in claim 35, wherein said signal transmitting portions include electromagnetic means.

*38. In a method of individually removing selected cigarettes or analogous rod-shaped articles from a predetermined path for a series of equidistant discrete articles moving at an elevated speed and forming a plurality of groups, the articles of one of said groups alternating with the articles of another of said groups and the removal of selected articles being effected by a separating force to the action of which a selected article is subjected in response to a signal, the steps of transmitting signals for removal of selected articles of said one group along a first route; transmitting signals for removal of selected articles of said other group along a second route; starting the action of said separating force in response to the thus transmitted signals and in a direction which crosses said path at a point coinciding with the locus of the respective selected article; and moving said point of application of said separating force along said path at said elevated speed and through a predetermined distance not appreciably less than the distance between two neighboring articles of said series.*

*39. In a method as defined in claim 38, wherein said step of starting the action of said separating force is initiated prior to arrival of the respective selected article at said locus so that said separating force is built up and is fully effective as soon as the respective selected article reaches said locus.*

*40. In a method as defined in claim 38, wherein said separating force is furnished at least in part by a gaseous fluid.*

*41. Apparatus for individually removing cigarettes or analogous rod-shaped articles from a series of equidistant discrete articles which form a plurality of groups and wherein the articles of one of said groups alternate with the articles of another of said groups, comprising conveyor means arranged to move said series of articles along a predetermined path at an elevated speed, said conveyor means having equidistant receiving means for the articles of said series; ejector means actuatable to subject selected articles of said series to the action of separating forces acting transversely of said path to thereby remove said selected articles from the respective receiving means, each of said forces being effective along a predetermined portion of said path whose length is not appreciably less than the distance between a pair of neighboring receiving means; control means for moving the points of application of said separating forces at said elevated speed along said path; and means for actuating said ejector means not later than when a selected article of said series reaches said predetermined portion of said path, including means for generating signals representing selected articles of said one group and said other group, means for transmitting to said ejector means along a first route signals representing said selected articles of said one group, and means for transmitting to said ejector means along a second route signals representing said selected articles of said other group.*

*42. Apparatus as defined in claim 41, wherein said ejector means comprises a discrete pneumatic ejector for each of said plurality of groups.*

*43. Apparatus as defined in claim 41, wherein said signal generating means comprises means for testing the articles of said series and for producing said signals in response to detection of defective articles.*

*44. Apparatus as defined in claim 41, wherein each of said signal transmitting means comprises means for actuating said ejector means before a selected article of said series reaches said predetermined portion of said path so that the removal of such selected article begins as soon as the article to be removed reaches said predetermined portion of said path.*

*45. Apparatus for selectively removing discrete cigarettes or analogous rod-shaped smokers' products from equally spaced product-receiving means of a conveyor, comprising at least one control means which is operative to release products to the action of separating forces acting in a direction to remove the products from the respective receiving means; means for supplying signals for operation of said control means so as to maintain said control means in operative condition for an interval of time which is longer than that necessary to move a selected receiving means through a distance equal to that between two neighboring receiving means on said conveyor; and ejector means for applying said separating forces to a product in said selected receiving means while said control means is in operative condition and for an interval of time which at most equals the interval necessary to move said selected receiving means through said distance.*

* * * * *